United States Patent
Prasad et al.

(10) Patent No.: US 11,265,143 B2
(45) Date of Patent: Mar. 1, 2022

(54) ANONYMIZED GENERATING AND PROVING OF PROCESSED DATA

(71) Applicant: Siemens Healthcare GmbH, Erlangen (DE)

(72) Inventors: Srikrishna Prasad, Erlangen (DE); Shylashree Nagaraja, Bangalore (IN)

(73) Assignee: SIEMENS HEALTHCARE GMBH, Erlangen (DE)

(*) Notice: Subject to any disclaimer, the term of this patent is extended or adjusted under 35 U.S.C. 154(b) by 0 days.

(21) Appl. No.: 17/350,296

(22) Filed: Jun. 17, 2021

(65) Prior Publication Data

US 2021/0409190 A1 Dec. 30, 2021

(30) Foreign Application Priority Data

Jun. 26, 2020 (DE) .................... 10 2020 207 980

(51) Int. Cl.
*H04L 9/00* (2006.01)
*H04L 9/08* (2006.01)
(Continued)

(52) U.S. Cl.
CPC .............. *H04L 9/008* (2013.01); *G06F 17/16* (2013.01); *H04L 9/0618* (2013.01); *H04L 9/0825* (2013.01); *H04L 9/0869* (2013.01)

(58) Field of Classification Search
CPC ..... H04L 9/008; H04L 9/0869; H04L 9/0825; H04L 9/0618; H04L 9/00; H04L 9/08; H04L 9/06; G06F 17/16
See application file for complete search history.

(56) References Cited

U.S. PATENT DOCUMENTS 8,515,058 B1 * 8/2013 Gentry .................. H04L 9/008
380/28
10,075,288 B1 * 9/2018 Khedr ....................... H04L 9/30
(Continued)

OTHER PUBLICATIONS

German Office Action and English translation thereof dated Feb. 8, 2021.
(Continued)

*Primary Examiner* — Quazi Farooqui
(74) *Attorney, Agent, or Firm* — Harness, Dickey & Pierce, P.L.C.

(57) ABSTRACT

A computer-implemented method is for providing processed data. In an embodiment, the method includes receiving, by a first encryption entity, first plaintext data including a matrix of numbers; determining, by the first encryption entity, an encryption key including an integer matrix; homomorphically encrypting, by the first encryption entity, the first plaintext data based on a matrix multiplication of the first plaintext data and the encryption key, to generate first encrypted data; sending, by the first encryption entity, the first encrypted data to a processing entity; receiving, by a decryption entity, encrypted processed data from the processing entity, the encrypted processed data being based on the first encrypted data; decrypting, by the decryption entity, the encrypted processed data based on a matrix multiplication of the processed data and an inverse of the encryption key, to generate processed data; and providing, by the decryption entity, the processed data.

18 Claims, 9 Drawing Sheets

(51) Int. Cl.
*H04L 9/06* (2006.01)
*G06F 17/16* (2006.01)

(56) References Cited

U.S. PATENT DOCUMENTS

| | | |
|---|---|---|
| 2013/0329883 A1 | 12/2013 | Tamayo-Rios |
| 2018/0359084 A1 | 12/2018 | Jain et al. |
| 2019/0087689 A1 | 3/2019 | Chen |
| 2019/0197426 A1* | 6/2019 | Kawano ................ G06N 10/00 |

OTHER PUBLICATIONS

German Decision to Grant and English translation thereof dated Jun. 23, 2021.
C. Fontaine and F. Galand, "A Survey of Homomorphic Encryption for Nonspecialists", EURASIP J. on Info. Security 013801 (2007).
R. Kannan and A. Bachem: "Polynomial Algorithms for Computing the Smith and Hermite Normal Forms of an Integer Matrix", SIAM Journal on Computing. 8:4 (1979), doi:10.1137/0208040, pp. 499-507.
German Office Action for German Application No. 10 2020 207 980.3 dated Feb. 11, 2021.

* cited by examiner

ANONYMIZED GENERATING AND PROVING OF PROCESSED DATA

PRIORITY STATEMENT

The present application hereby claims priority under 35 U.S.C. § 119 to German patent application number DE 102020207980.3 filed Jun. 26, 2020, the entire contents of which are hereby incorporated herein by reference.

AFFILIATION STATEMENT

The inventor Shylashree Nagaraja is affiliated with the Department of Electronics and Communication Engineering, RV College of Engineering, 8th Mile, Mysuru Road, RV Vidyaniketan Post, Bengaluru—560059, INDIA.

FIELD

Example embodiments of the invention generally relate to anonymized generating and proving of processed data.

BACKGROUND

For processing large amounts of data, e.g. for training a machine learning algorithm, a common approach is to make use of external resources, in particular, cloud computing resources. For example, training data sets can be stored within cloud storage, and a machine learning algorithm can be trained by a cloud computing processor based on the training data sets.

However, using of external resources can be hampered in situations where the resource provider should not have access to the training data, for example due to data privacy regulations. In particular, this is a problem for medical data containing protected health information (an acronym is PHI).

A common approach for processing medical data at external resources is anonymizing or pseudonymizing the medical data before storing and/or processing within the external resources. This approach has the disadvantage that it might not be possible to fully anonymize or pseudonymize the data without losing relevant information. For example, if the medical data is a medical imaging dataset based on a computed tomography or a magnetic resonance imaging, the pixel alone could be used for identifying the respective patient (e.g., by volume rendering the data, reconstruction the face of the patient).

Another possibility is to encrypt the data before storing and/or processing the data within the external resources. However, the encrypting operation and the usage of the machine learning algorithm do not necessarily commute, so that it is not possible to use a machine learning algorithm trained by way of encrypted data (a synonym is "ciphertext") for drawing conclusions about unencrypted data (a synonym is "plaintext").

A potential solution for this problem is homomorphically encrypting the training data. Homomorphic encryption is a form of encryption that allows computation on ciphertexts, generating an encrypted result which, when decrypted, matches the result of the operations as if they had been performed on the plaintext. A well-known algorithm having multiplicative homomorphic properties is the RSA (acronym for "Rivest, Shamir, Adleman") public-key encryption algorithm.

However, a for decreasing the vulnerability against attacks, a homomorphic encryption scheme should be semantically secure, which in general terms relates to the fact that an adversary should not be able to discover any partial information from a ciphertext. Since RSA is deterministic in its original form, it is not semantically secure. Any attempt to make it probabilistic breaks its homomorphic properties (see e.g. C. Fontaine and F. Galand, "A Survey of Homomorphic Encryption for Nonspecialists", EURASIP J. on Info. Security 013801 (2007), https://doi.org/10.1155/2007/13801).

SUMMARY

The inventors have discovered that an improvement upon an underlying problem is to provide an efficient homomorphic encryption scheme that can be used for machine learning within external resources. Advantageous embodiments are described in the claims and in the following specification.

In the following, embodiments according to the invention are described with respect to systems as well as with respect to methods. Features, advantages or alternative embodiments herein can be assigned to the other corresponding claimed objects and vice versa. In other words, the systems can be improved with features described or claimed in the context of the corresponding method. In this case, the functional features of the methods are embodied by objective units of the systems.

According to a first embodiment, the invention relates to a computer-implemented method for providing processed data. The method comprises receiving, by a first encryption entity, first plaintext data, the first plaintext data comprising a matrix of numbers. The method furthermore comprises determining, by the first encryption entity, an encryption key, the encryption key comprising an integer matrix. Furthermore, the method comprises homomorphically encrypting, by the first encryption entity, the first plaintext data based on a matrix multiplication of the first plaintext data and the encryption key, thereby generating first encrypted data. The method furthermore comprises sending, by the first encryption entity, the first encrypted data to a processing entity, and receiving, by a decryption entity, encrypted processed data from the processing entity, wherein the encrypted processed data is based on the first encrypted data. Furthermore, the method comprises decrypting, by the decryption entity, the encrypted processed data based on a matrix multiplication of the processed data and the inverse of the encryption key, thereby generating processed data, and providing, by the decryption entity, the processed data.

According to a second embodiment, the invention relates to a providing system for providing processed data, comprising a first encryption entity and a decryption entity, wherein the first encryption entity is configured for receiving first plaintext data, the first plaintext data comprising a matrix of numbers, wherein the first encryption entity is configured for determining an encryption key, the encryption key comprising an integer matrix, wherein the first encryption entity is configured for homomorphically encrypting the first plaintext data based on a matrix multiplication of the first plaintext data and the encryption key, thereby generating first encrypted data, wherein the first encryption entity is configured for sending the first encrypted data to a processing entity, wherein the decryption entity is configured for receiving encrypted processed data from the processing entity, wherein the encrypted processed data is based on the first encrypted data, wherein the decryption entity is configured for decrypting the encrypted processed data based on a matrix multiplication of the processed data and the inverse of the encryption key, thereby generating processed data, wherein the decryption entity is configured for providing the processed data.

According to a third embodiment, the invention relates to a computer program comprising instructions which, when the program is executed by a providing system, cause the providing system to carry out the method according to an embodiment of the invention and its aspects.

According to a fourth embodiment, the invention relates to a computer-readable medium comprising instructions which, when executed by a providing system, cause the providing system to carry out the method according to an embodiment of the invention and its aspects.

Another embodiment is directed to a computer-implemented method for providing processed data, comprising:

receiving, by a first encryption entity, first plaintext data, the first plaintext data including a matrix of numbers;

determining, by the first encryption entity, an encryption key, the encryption key including an integer matrix;

homomorphically encrypting, by the first encryption entity, the first plaintext data based on a matrix multiplication of the first plaintext data and the encryption key, to generate first encrypted data;

sending, by the first encryption entity, the first encrypted data to a processing entity;

receiving, by a decryption entity, encrypted processed data from the processing entity, the encrypted processed data being based on the first encrypted data;

decrypting, by the decryption entity, the encrypted processed data based on a matrix multiplication of the processed data and an inverse of the encryption key, to generate processed data; and providing, by the decryption entity, the processed data.

Another embodiment is directed to a providing system for providing processed data, comprising:

a first encryption entity, configured to
receive first plaintext data, the first plaintext data including a matrix of numbers,
determine an encryption key, the encryption key including an integer matrix,
homomorphically encrypt the first plaintext data based on a matrix multiplication of the first plaintext data and the encryption key, to generate first encrypted data, and
send the first encrypted data to a processing entity; and a decryption entity, configured to
receive encrypted processed data from the processing entity, the encrypted processed data being based on the first encrypted data,
decrypt the encrypted processed data based on a matrix multiplication of the processed data and an inverse of the encryption key, to generate processed data, and
provide the processed data.

Another embodiment is directed to a non-transitory computer program product storing a program including instructions which, when the program is executed by a providing system, cause the providing system to carry out the method of an embodiment.

Another embodiment is directed to a non-transitory computer-readable medium storing instructions which, when executed by a providing system, cause the providing system to carry out the method of an embodiment.

BRIEF DESCRIPTION OF THE DRAWINGS

The properties, features and advantages of this invention described above, as well as the manner they are achieved, become clearer and more understandable in the light of the following description and embodiments, which will be described in detail in the context of the drawings. This following description does not limit the invention on the contained embodiments. Same components or parts can be labeled with the same reference signs in different figures. In general, the figures are not for scale. In the following.

DETAILED DESCRIPTION OF THE EXAMPLE EMBODIMENTS

Figure 1:
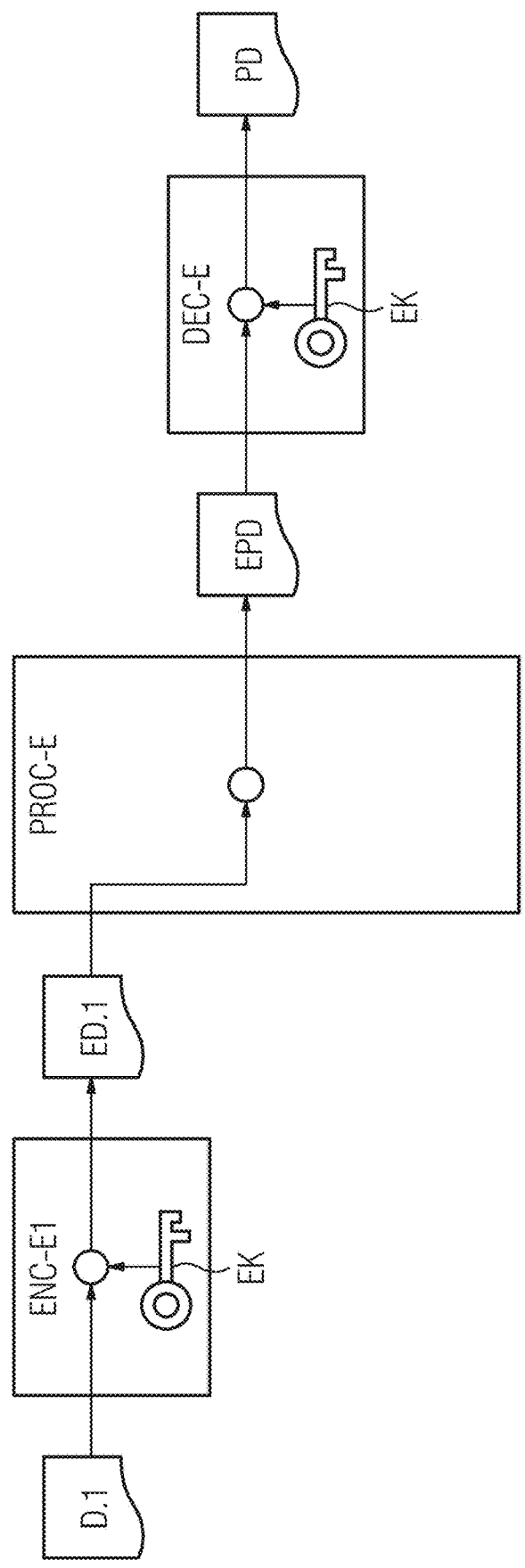
FIG. 1 displays a data flow of a first embodiment of the method for providing processed data, FIG. 2 displays a data flow of a second embodiment of the method for providing processed data, FIG. 3 displays a data flow of a third embodiment of the method for providing processed data, FIG. 4 displays a flowchart of a first embodiment of the method for providing processed data, FIG. 5 displays a flowchart of a second embodiment of the method for providing processed data, FIG. 6 displays a flowchart of a third embodiment of the method for providing processed data, FIG. 7 displays a flowchart of a fourth embodiment of the method for providing processed data, FIG. 8 displays a flowchart of a fifth embodiment of the method for providing processed data, FIG. 9 embodiments of a first encryption entity, a second encryption entity, a decryption entity and a cloud entity.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/ DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment, the invention relates to a computer-implemented method for providing processed data. The method comprises receiving, by a first encryption entity, first plaintext data, the first plaintext data comprising a matrix of numbers. The method furthermore comprises determining, by the first encryption entity, an encryption key, the encryption key comprising an integer matrix. Furthermore, the method comprises homomorphically encrypting, by the first encryption entity, the first plaintext data based on a matrix multiplication of the first plaintext data and the encryption key, thereby generating first encrypted data. The method furthermore comprises sending, by the first encryption entity, the first encrypted data to a processing entity, and receiving, by a decryption entity, encrypted processed data from the processing entity, wherein the encrypted processed data is based on the first encrypted data. Furthermore, the method comprises decrypting, by the decryption entity, the encrypted processed data based on a matrix multiplication of the processed data and the inverse of the encryption key, thereby generating processed data, and providing, by the decryption entity, the processed data.

In particular, a matrix multiplication of the first plaintext data and the encryption key is equivalent to a matrix multiplication of the matrix of number the first plaintext data is comprising and the integer matrix the encryption key is comprising.

Optionally, the method can comprise a step of transmitting the encryption key from the first encryption entity to the decryption entity. In particular, this step of transmitting can be executed in an encrypted way, e.g., by using asymmetric encryption.

In particular, the first plaintext data is training data for a machine learning algorithm. In particular, the first plaintext data comprises training input data for the machine learning algorithm, and a respective ground truth data, so that the machine learning algorithm can be trained based on a comparison of the result of its application to the training input data and the ground truth data.

The first plaintext data comprises a matrix of numbers (also denoted as "first plaintext matrix of numbers"). In particular, the first plaintext data can be equal to the matrix of numbers. In particular, the first plaintext data can comprise a first matrix of numbers corresponding to training input data, and a second matrix of numbers corresponding to the respective ground truth data.

In particular, a matrix of numbers is a matrix of (negative and/or positive) integers, of rational numbers or of real numbers. In particular, a matrix of integer numbers can be a matrix of elements of a finite field. In particular, a matrix is a rectangular array of those numbers, arranged in rows and columns. A row vector is a matrix with only one row, and a column vector is a matrix with only one column. The term "vector" refers to either a row vector or a column vector. A number can be interpreted as a matrix with one row and one column. In particular, the first plaintext matrix of numbers comprises at least two rows and/or at least two columns.

In particular, the first encrypted data comprises a matrix of numbers (also denoted as "first encrypted matrix of numbers"). In particular, the first encrypted data can be equal to the matrix of numbers. In particular, the first encrypted matrix of numbers is a matrix over the same field as the first plaintext matrix of numbers. In particular, the first encrypted matrix of numbers has the same number of rows and/or the same number of columns as the first plaintext matrix of numbers.

In particular, the encryption key includes at least one integer matrix. In particular, the encryption key is equivalent to exactly one integer matrix. In particular, the at least one integer matrix or the exactly one integer matrix has the same number of rows and/or the same number of columns as the first plaintext matrix of numbers.

In particular, the encrypted processed data comprises a matrix of numbers (also denoted as "encrypted processed matrix of numbers"). In particular, the encrypted processed data can be equal to the matrix of numbers.

In particular, the processed data (also denoted as "plaintext processed data") comprises a matrix of numbers (also denoted as "processed matrix of numbers" or "plaintext processed matrix of numbers"). In particular, the processed data can be equal to the matrix of numbers. In particular, the processed matrix of numbers is a matrix over the same field as the encrypted processed matrix of numbers. In particular, the processed matrix of numbers has the same number of rows and/or the same number of columns as the encrypted matrix of numbers.

In particular, the processing entity is different from the first encryption entity and the decryption entity. In particular, the processing entity is spatially separated from the first encryption entity and the decryption entity. The first encryption entity and the decryption entity can refer to both the same entity and different entities. In particular, the processing entity can be a cloud processing entity or a server processing entity.

The inventors recognized that by using the method according to at least one embodiment of the invention data can be processed at the processing entity, without the processing entity having the possibility to access plaintext data. Furthermore, encryption based on a matrix multiplication is very efficient, in particular, due to the use of an integer encryption key, since integer operations can be executed faster than floating point operations. Furthermore, since machine learning algorithms can often be expressed in terms of linear algebra calculations, the encryption and decryption process can efficiently be used for machine learning algorithms.

According to a further embodiment of the invention the method comprises receiving, by a second encryption entity, second plaintext data, the second plaintext data comprising a matrix of numbers, homomorphically encrypting, by the second encryption entity, the second plaintext data based on a matrix multiplication of the second plaintext data and the encryption key, thereby generating second encrypted data, and sending, by the second encryption entity, the second encrypted data to the processing entity, wherein the encrypted processed data is furthermore based on the second encrypted data.

In particular, the second plaintext data is training data for a machine learning algorithm. In particular, the second plaintext data comprises training input data for the machine learning algorithm, and a respective ground truth data, so that the machine learning algorithm can be trained based on a comparison of the result of its application to the training input data and the ground truth data.

The second plaintext data comprises a matrix of numbers (also denoted as "second plaintext matrix of numbers"). In particular, the second plaintext data can be equal to the matrix of numbers. In particular, the second plaintext data can comprise a first matrix of numbers corresponding to training input data, and a second matrix of numbers corresponding to the respective ground truth data.

In particular, the second plaintext matrix of numbers is a matrix over the same field as the first plaintext matrix of numbers. In particular, the second plaintext matrix of numbers has the same number of rows and/or the same number of columns as the first plaintext matrix of numbers.

In particular, the second encrypted data comprises a matrix of numbers (also denoted as "second encrypted matrix of numbers"). In particular, the second encrypted data can be equal to the matrix of numbers. In particular, the second encrypted matrix of numbers is a matrix over the same field as the second plaintext matrix of numbers. In particular, the second encrypted matrix of numbers has the same number of rows and/or the same number of columns as the second plaintext matrix of numbers.

In particular, the processing entity is different from the second encryption entity. In particular, the processing entity is spatially separated from the second encryption entity. The first encryption entity and the decryption entity can refer to both the same entity and different entities. The second encryption entity and the decryption entity can refer to both the same entity and different entities.

In particular, the first encryption entity and the second encryption entity can be the same entity, while the decryption entity is different from both the first encryption entity and the second encryption entity. In particular, the first encryption entity and the decryption entity can be the same entity, while the second encryption entity is different from both the first encryption entity and the decryption entity. In particular, the first encryption entity, the second encryption entity and the decryption entity can be pairwise different.

The inventors recognized that by using encrypted data from a second encryption entity data from different institutions can be processed at the processing entity, without the processing entity being able to access the plaintext data. In the context of machine learning this enables to gather data from different encryption entities within the processing entity, in order to train a unified machine learning model.

According to a further possible embodiment, the method furthermore comprises processing, by the processing entity, the first encrypted data and/or the second encrypted data, thereby generating the encrypted processed data. In particular, the step of processing can comprise linear algebra computation based on the matrix of numbers comprised by the first encrypted data and/or the second encrypted data.

The inventors recognized that by processing the first encrypted data and/or the second encrypted data within the processing entity the larger computational power of the processing entity can be used, so that the processing is faster than compared to processing within the first encryption entity and/or the second encryption entity.

According to a further embodiment of the invention, the first encrypted data and/or the second encrypted data are matrices of numbers, and processing the first encrypted data and/or the second encrypted data comprises at least one of the following operations: inversion of the first encrypted data and/or the second encrypted data, scalar multiplication of a number and the first encrypted data and/or the second encrypted data, addition or subtraction of the first encrypted data and the second encrypted data, and matrix multiplication of the first encrypted data and the second encrypted data.

The inventors recognized that by the operation, all linear algebra operations based on the first encrypted data and/or the second encrypted data can be created. At the same time, due to the homomorphic encryption, also all linear algebra operations based on the first plaintext data and/or the second plaintext data can be executed by encrypting the data, processing the encrypted data at the processing entity, and decrypting the data again.

According to a further embodiment of the invention, processing the first encrypted data and/or the second encrypted data comprises training a machine learning model.

In general, a machine learning model mimics cognitive functions that humans associate with other human minds. In particular, by training based on training data the machine learning model is able to adapt to new circumstances and to detect and extrapolate patterns.

In general, parameters of a machine learning model can be adapted by way of training. In particular, supervised training, semi-supervised training, unsupervised training, reinforcement learning and/or active learning can be used. Furthermore, representation learning (an alternative term is "feature learning") can be used. In particular, the parameters of the machine learning model can be adapted iteratively by several steps of training.

In particular, a machine learning model can comprise a neural network, a support vector machine, a decision tree and/or a Bayesian network, and/or the machine learning model can be based on k-means clustering, Q-learning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

The inventors recognized that within the training of a machine learning model a large amount of training datasets must be used, beneficially training datasets originating from different entities. By processing at a cloud entity, these large amounts of data can be handled more efficient and, in particular, faster than at usual local entities. By using the homomorphic encryption according to the invention, the fast processing can also be used in situations where the training datasets should not be disclosed to the processing entity.

According to a further embodiment of the invention, the step of determining the encryption key comprises generating a random integer matrix and determining a unimodular integer matrix, wherein the matrix product of the unimodular integer matrix and the random integer matrix equals the hermite normal form of the random integer matrix. According to this embodiment, the encryption key comprises the matrix product of the unimodular integer matrix, of an exchange matrix and of the inverse of the unimodular integer matrix. In particular, the result of this matrix product is an involuntary matrix.

In particular, a random integer matrix is a matrix of integers, wherein each entry is a random integer. In particular, the random distribution of each entry of the random integer matrix is independent from the other entries of the random integer matrix (in other words, the entries of the random integer matrix are statistically independent). In particular, each entry of the random integer matrix is equally distributed.

A unimodular matrix is a square integer matrix having determinant +1 or −1. Equivalently, a unimodular matrix is an integer matrix that is invertible over the integers, in other words, there is an integer matrix that is its inverse.

An exchange matrix is an anti-diagonal matrix with the counter-diagonal entries being 1 and all other entries being 0. For arbitrary fields, "1" is equivalent to the neutral element of the multiplicative operation, and "0" is equivalent to the neutral element of the additive operation. Synonyms for "exchange matrix" are "reversal matrix", "backward identity matrix", and/or "standard involutory permutation matrix".

The inventors recognized that the matrix product of the unimodular integer matrix, of an exchange matrix and of the inverse of the unimodular integer matrix is an involuntary integer matrix. By using encryption keys based on involuntary integer matrices, there is no need for a dedicated calculation of a matrix inverse for the involuntary matrix, so that the effort of encrypting and decrypting is reduced. Furthermore, calculations with integer matrices are computational faster than with floating point numbers. This is of particular relevance if also the plaintext data can be represented as integer matrices (e.g. in the case of image data, wherein each pixel can comprise an integer intensity value).

According to a further possible embodiment of the invention, the first plaintext data and/or the second plaintext data are integer matrices. The inventors recognized that by using integer matrices the necessary calculations for encrypting and decrypting do not involve floating point operations, so they can be executed faster.

According to a further possible embodiment of the invention, the first plaintext data and the encryption key are matrices over a finite field. The inventor recognized that based on finite fields also a division of numbers does not result in a floating point number, so that the result of a division can be processed without floating point operations.

According to a further embodiment of the invention, the processed data comprises parameters of a machine learning model. According to a further embodiment of the invention the machine learning model is an artificial neural network, and the processed data comprises edge weights of the artificial neural network.

The inventors recognized that within the training of a machine learning model a large amount of training datasets must be used, beneficially training datasets originating from different entities. By processing at a cloud entity, these large amounts of data can be handled more efficient and, in particular, faster than at usual local entities. By using the homomorphic encryption according to the invention, the fast processing can also be used in situations where the training datasets should not be disclosed to the processing entity. Furthermore, the parameters of a machine learning model or, in particular, the edge weights of an artificial neural networks, are the relevant data for using the machine learning model in the prediction phase.

According to a further embodiment of the invention, the method comprises receiving, by the first encryption entity, the encrypted processed data from the processing entity, decrypting, by the first encryption entity, the encrypted processed data, thereby generating the processed data, and verifying, by the first encryption entity, the processed data.

The inventors recognized that by verifying the processed data it can be ensured that the processed data is correct and has not been corrupted by the processing entity.

According to a second embodiment, the invention relates to a providing system for providing processed data, comprising a first encryption entity and a decryption entity,
   wherein the first encryption entity is configured for receiving first plaintext data, the first plaintext data comprising a matrix of numbers,
   wherein the first encryption entity is configured for determining an encryption key, the encryption key comprising an integer matrix,
   wherein the first encryption entity is configured for homomorphically encrypting the first plaintext data based on a matrix multiplication of the first plaintext data and the encryption key, thereby generating first encrypted data,
   wherein the first encryption entity is configured for sending the first encrypted data to a processing entity,
   wherein the decryption entity is configured for receiving encrypted processed data from the processing entity, wherein the encrypted processed data is based on the first encrypted data,
   wherein the decryption entity is configured for decrypting the encrypted processed data based on a matrix multiplication of the processed data and the inverse of the encryption key, thereby generating processed data,
   wherein the decryption entity is configured for providing the processed data.

In particular, the providing system is configured for executing the method for providing processed data according to an embodiment of the invention and its aspects. In particular, the providing system is configured for executing the method for providing processed data by the first encryption entity, the decryption entity and the processing entity being configured for executing the single steps of the method for providing processed data.

According to a further embodiment of the invention, the providing furthermore comprises a processing entity, the processing entity being configured for processing the first encrypted data, thereby generating the encrypted processed data.

According to a third embodiment, the invention relates to a computer program comprising instructions which, when the program is executed by a providing system, cause the providing system to carry out the method according to an embodiment of the invention and its aspects.

According to a fourth embodiment, the invention relates to a computer-readable medium comprising instructions which, when executed by a providing system, cause the providing system to carry out the method according to an embodiment of the invention and its aspects.

The realization of an embodiment of the invention by a computer program product and/or a computer-readable medium has the advantage that already existing providing systems can be easily adopted by software updates in order to work as proposed by the invention.

The computer program product can be, for example, a computer program or comprise another element apart from the computer program. This other element can be hardware, for example a memory device, on which the computer program is stored, a hardware key for using the computer program and the like, and/or software, for example a documentation or a software key for using the computer program.

Figure 2:
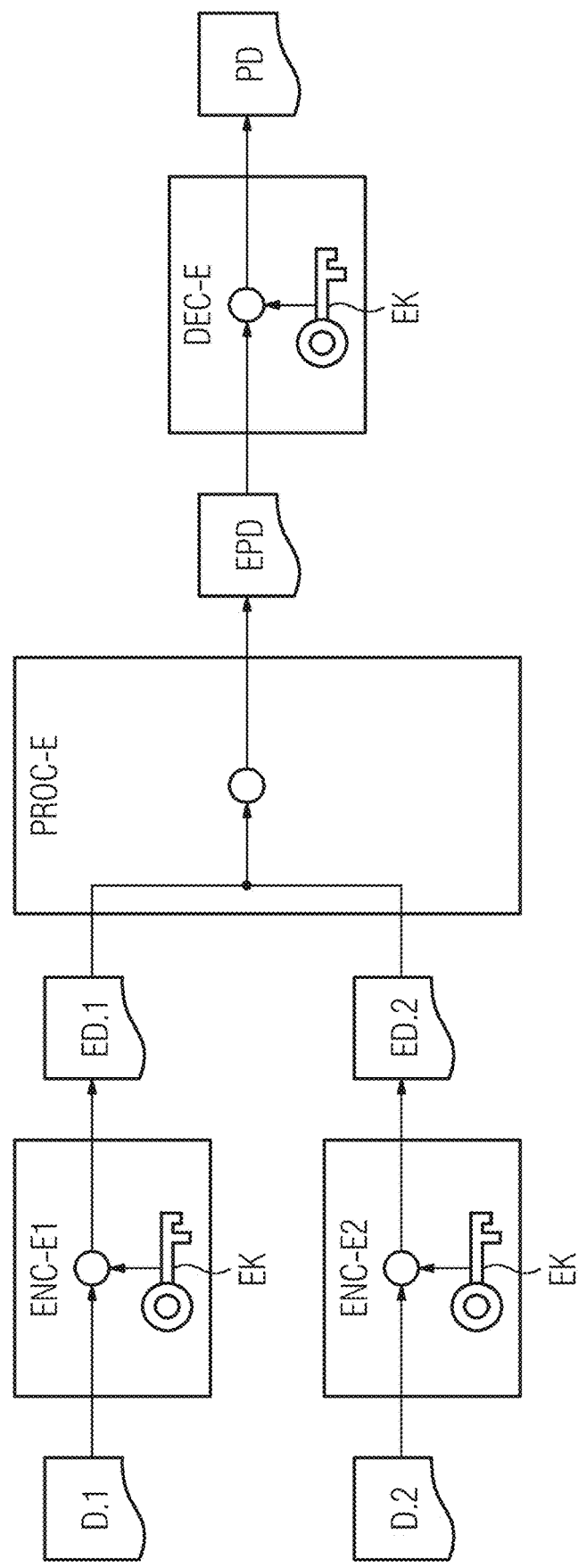

FIG. 1 and FIG. 2 display data flows of a first embodiment and a second embodiment of the method for providing processed data PD. The data flow is between a first encryption entity ENC-E1, a second encryption entity ENC-E1, a processing entity PROC-E and a decryption entity DEC-E. The second encryption entity is only present in the second embodiment displayed in FIG. 2. In both embodiments, the entities are pairwise different. Alternatively, the first encryption entity ENC-E1 and the second encryption entity ENC-E1 can be the same entity, and the decryption entity DEC-E is different from the first encryption entity ENC-E1 and the second encryption entity ENC-E1. Alternatively, the first encryption entity ENC-E1 and the decryption entity DEC-E can be the same entity, and the second encryption entity ENC-E2 is different from the first encryption entity ENC-E1 and the decryption entity. Alternatively, the first encryption entity ENC-E1, the second encryption entity ENC-E2 and the decryption entity DEC-E can be the same entity.

Within the first embodiment displayed in FIG. 1, the first encryption entity ENC-E1 receives first plaintext data D.1 and uses an encryption key EK stored within the first encryption entity ENC-E1 in order to create first encrypted data ED.1. The first encrypted data ED.1 is transmitted to the processing entity PROC-E, where the first encrypted data ED.1 is processed and encrypted processed data EPD is generated. The encrypted processed data EPD is transmitted from to the decryption entity DEC-E, where the encrypted processed data EPD is decrypted by using the encryption key EK stored within the decryption entity DEC-E in order to created processed data PD. The processed data PD can then be provided.

Within the second embodiment displayed in FIG. 2, the first encryption entity ENC-E1 receives first plaintext data D.1 and uses an encryption key EK stored within the first encryption entity ENC-E1 in order to create first encrypted data ED.1. Furthermore, the second encryption entity ENC-E2 receives second plaintext data D.2 and uses an encryption key EK stored within the second encryption entity ENC-E2 in order to create second encrypted data ED.2. The first encrypted data ED.1 and the second encrypted data ED.2 are transmitted to the processing entity PROC-E, where the first encrypted data ED.1 and the second encrypted data ED.2 are processed and encrypted processed data EPD is generated. The encrypted processed data EPD is transmitted from to the decryption entity DEC-E, where the encrypted processed data EPD is decrypted by using the encryption key EK stored within the decryption entity DEC-E in order to created processed data PD. The processed data PD can then be provided.

Figure 3:
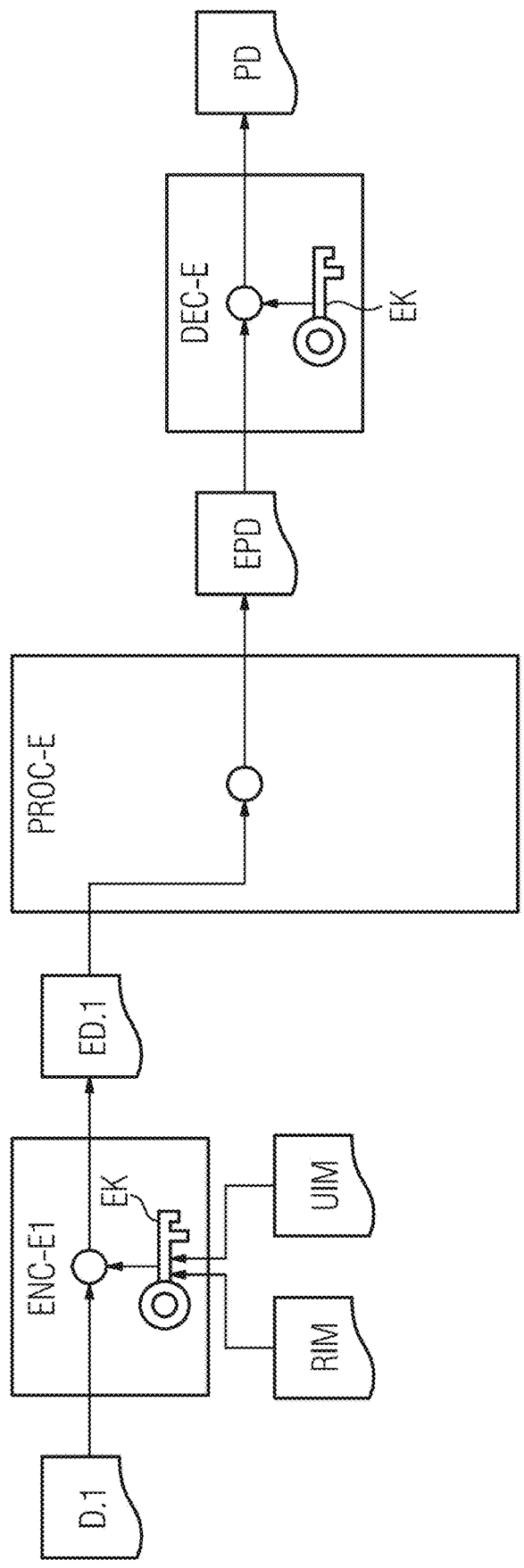

FIG. 3 displays a data flow of a third embodiment of the method for providing processed data PD. Here, the encryption key EK is calculated based on a random integer matrix RIM and a unimodular integer matrix UIM received and/or determined by the first encryption entity ENC-E1.

In particular, if A denotes the encryption key being an integer n×n-matrix, R denotes the random integer n×n-matrix R, and U denotes the unimodular integer n×n-matrix UIM. U is chosen so that $H = U \cdot R$, wherein H is an upper triangular (that is, $H_{ij} = 0$ for $i > j$) matrix with any rows of zeros are located below any other row, wherein for H the leading coefficient (the first nonzero entry from the left, also called the pivot) of a nonzero row is always strictly to the right of the leading coefficient of the row above it and the leading coefficient is is positive, and wherein for H the elements below pivots are zero and elements above pivots are nonnegative and strictly smaller than the pivot. For given R, the matrices H and U can be calculated even in polynomial time, see e.g. R. Kannan and A. Bachem: "Polynomial Algorithms for Computing the Smith and Hermite Normal Forms of an Integer Matrix", SIAM Journal on Computing. 8:4 (1979), doi:10.1137/0208040, pp. 499-507, the entire contents of which are hereby incorporated herein by reference.

The matrix A being the encryption key EK can then be determined as $A = U \cdot I_F \cdot U^{-1}$, wherein $I_F$ is the exchange n×n-matrix with $I_{F,ij} = 1$ for $i = n-j+1$ and $I_{F,ij} = 0$ otherwise. So A is in fact an involuntary matrix, since $$A^{-1} = (U \cdot I_F \cdot U^{-1})^{-1} = U^{-1} \cdot I_F^{-1} \cdot U = U \cdot I_F \cdot U^{-1} = A$$

since $I_F \cdot I_F = \mathrm{id}$ and so $I_F^{-1} = I_F$. Using involuntary matrices as encryption key has the advantage that the matrix inversion of these matrices does not need to be calculated separately.

In the following, it will be demonstrated how different linear algebra operations can be performed by the processing entity PROC-E. In the following, A will denote the encryption key EK. In particular, A is an involuntary matrix, implying that $A^{-1} = A$. The matrices D will denote plaintext data D.1, D.2, the matrices C will denote encrypted data ED.1, ED.2.

Matrix Inversion

Let D be a n×n-matrix, and let A be an involuntary n×n-matrix. The encrypted matrix C can be calculated as $C = A \cdot D \cdot A^{-1}$. Within the processing entity, the inverse $C^{-1}$ of the encrypted matrix C can be calculated, being the encrypted processed data EPD. The processed data PD can then be calculated based on the matrix A as $A^{-1} \cdot C^{-1} \cdot A = A^{-1} \cdot (A \cdot D \cdot A^{-1})^{-1} \cdot A = D^{-1}$.

Alternatively, the encrypted matrix C can be calculated as $C = A \cdot D$. Within the processing entity, the inverse $C^{-1}$ of the encrypted matrix C can be calculated, being the encrypted processed data EPD. The processed data PD can then be calculated based on the matrix A as $C^{-1} \cdot A = (A \cdot D)^{-1} \cdot A = D^{-1}$.

Multiplication of Square Matrices

Let $D_1$ and $D_2$ be n×n-matrices (both corresponding to the first plaintext data D.1, or one corresponding to the first plaintext data D.1 and the other one corresponding to the second plaintext data D.2), and let A be an involuntary n×n-matrix (corresponding to the encryption key EK). The encrypted matrices $C_1$ and $C_2$ (both corresponding to the first encrypted data ED.1, or one corresponding to the first encrypted data ED.1 and the other one corresponding to the second encrypted data ED.2) can be calculated as $C_1 = A \cdot D_1 \cdot A^{-1}$ and $C_2 = A \cdot D_2 \cdot A^{-1}$, respectively.

Within the cloud computing environment, the product $C_1 \cdot C_2$ of the encrypted matrices $C_1$ and $C_2$ can be calculated, being the encrypted processed data EPD. The processed data PD can then be calculated based on the matrix A as $$A^{-1} \cdot C_1 \cdot C_2 \cdot A = A^{-1} \cdot A \cdot D_1 \cdot A^{-1} \cdot A \cdot D_2 \cdot A^{-1} \cdot A = D_1 \cdot D_2$$

and is in fact equivalent to the product $D_1 \cdot D_2$ of the plaintext matrices $D_1$ and $D_2$.

Alternatively, the encrypted matrices $C_1$ and $C_2$ can be calculated as $C_1 = A \cdot D_1$ and $C_2 = D_2 \cdot A^{-1}$, respectively. The processed data PD can then still be calculated based on the matrix A as $$A^{-1} \cdot C_1 \cdot C_2 \cdot A = A^{-1} \cdot A \cdot D_1 \cdot D_2 \cdot A^{-1} \cdot A = D_1 \cdot D_2$$

and is in fact equivalent to the product $D_1 \cdot D_2$ of the plaintext matrices $D_1$ and $D_2$.

Multiplication of Square Matrix and Vectors

Let $D_1$ be an n×n-matrix, let $D_2$ be an n×1 column vector, and let $D_3$ be an 1×n row vector (corresponding to the first plaintext data D.1 and/or corresponding to the second plaintext data D.2), and let A be an involuntary n×n-matrix (corresponding to the encryption key EK). The encrypted matrices $C_1$, $C_2$ and $C_3$ (corresponding to the first encrypted data ED.1 and/or corresponding to the second encrypted data ED.2) can be calculated as $C_1 = A \cdot D_1 \cdot A^{-1}$, $C_2 = A \cdot D_2$ and $C_3 = D_3 \cdot A^{-1}$, respectively.

Within the processing entity, the product $C_1 \cdot C_2$ of the encrypted matrix $C_1$ and the encrypted column vector $C_2$ can be calculated, or the product $C_3 \cdot C_1$ of the encrypted matrix $C_1$ and the encrypted row vector $C_3$ can be calculated, corresponding to the encrypted processed data EPD. The processed data PD can then be calculated based on the matrix A as $$A^{-1} \cdot C_1 \cdot C_2 = A^{-1} \cdot A \cdot D_1 \cdot A^{-1} \cdot A \cdot D_2 = D_1 \cdot D_2 \text{ or}$$

$$C_3 \cdot C_1 \cdot A = D_3 \cdot A^{-1} \cdot A \cdot D_1 \cdot A^{-1} \cdot A = D_3 \cdot D_1$$

and is in fact equivalent to the product $D_1 \cdot D_2$ of the plaintext matrix $D_1$ and the plaintext column vector $D_2$, or the product $D_3 \cdot D_1$ of the plaintext matrix $D_1$ and the plaintext row vector $D_3$.

Skalar Multiplication

Let $D_1$ be an m×n-matrix, let d be a scalar number (corresponding to the first plaintext data D.1). Furthermore, let $A_1$ be an involuntary m×m-matrix and let $A_2$ be an involuntary n×n-matrix (corresponding to the encryption key EK). The encrypted matrices $C_1$ (corresponding to the first encrypted data ED.1) can be calculated as $C_1 = A_1 \cdot D_1 \cdot A_2^{-1}$.

Within the processing entity, the scalar product $dC_1$ of the encrypted matrix $C_1$ and the scalar d can be calculated, corresponding to the encrypted processed data EPD. The processed data PD can then be calculated based on the matrices $A_1$ and $A_2$ as $$A_1^{-1} \cdot dC_1 \cdot A_2 = dA_1^{-1} \cdot A_1 \cdot D_1 \cdot A_2^{-1} \cdot A_2 = dD_1$$

and is in fact equivalent to the product $dD_1$ of the plaintext matrix $D_1$ and the scalar d.

Alternatively, the encrypted matrix $C_1$ can be calculated as $C_1 = A_1 \cdot D_1$, and the processed data PD can be calculated based only on the matrix $A_1$ as $$A_1^{-1} \cdot dC_1 = dA_1^{-1} \cdot A_1 \cdot D_1 = dD_1$$

and is in fact equivalent to the product $dD_1$ of the plaintext matrix $D_1$ and the scalar d.

Multiplication of Rectangular Matrices

Let $D_1$ be an k×m-matrix, and let $D_2$ be an m×n-matrix (corresponding to the first plaintext data D.1 and/or the second plaintext data D.2), k, m and n being integers. Furthermore, let $A_1$ be an involuntary k×k-matrix, $A_2$ be an involuntary m×m-matrix and $A_3$ be an involuntary n×n matrix (corresponding to the encryption key EK). The encrypted matrices $C_1$ and $C_2$ (corresponding to the first encrypted data ED.1 and/or corresponding to the second encrypted data ED.2) can be calculated as $C_1 = A_1 \cdot D_1 \cdot A_2^{-1}$ and $C_2 = A_2 \cdot D_2 \cdot A_3^{-1}$, respectively.

Within the processing entity, the product $C_1 \cdot C_2$ of the encrypted matrix $C_1$ and the encrypted matrix $C_2$ can be calculated, corresponding to the encrypted processed data EPD. The processed data PD can then be calculated based on the matrices $A_1$ and $A_3$ as $$A_1^{-1} \cdot C_1 \cdot C_2 \cdot A_3 = A_1^{-1} \cdot A_1 \cdot D_1 \cdot A_2^{-1} \cdot A_2 \cdot D_2 \cdot A_3^{-1} \cdot A_3 = D_1 \cdot D_2$$

and is in fact equivalent to the product $D_1 \cdot D_2$ of the plaintext matrix $D_1$ and the plaintext matrix $D_2$.

Alternatively, the encrypted matrices $C_1$ and $C_2$ can be calculated as $C_1 = A_1 \cdot D_1$ and $C_2 = D_2 \cdot A_3^{-1}$, respectively. The processed data PD can then still be calculated based on the matrices $A_1$ and $A_3$ as $$A_1^{-1} \cdot C_1 \cdot C_2 \cdot A_3 = A_1^{-1} \cdot A_1 \cdot D_1 \cdot D_2 \cdot A_3^{-1} \cdot A_3 = D_1 \cdot D_2$$

and is in fact equivalent to the product $D_1 \cdot D_2$ of the plaintext matrix $D_1$ and the plaintext matrix $D_2$.

Sum of Rectangular Matrices

Let $D_1$ and $D_2$ be an m×n-matrices (corresponding to the first plaintext data D.1 and/or the second plaintext data D.2), m and n being integers. Furthermore, let $A_1$ be an involuntary m×m-matrix and let $A_2$ be an involuntary n×n-matrix (corresponding to the encryption key EK). The encrypted matrices $C_1$ and $C_2$ (corresponding to the first encrypted data ED.1 and/or corresponding to the second encrypted data ED.2) can be calculated as $C_1 = A_1 \cdot D_1 \cdot A_2^{-1}$ and $C_2 = A_1 \cdot D_2 \cdot A_2^{-1}$, respectively.

Within the processing entity, the sum $C_1 + C_2$ of the encrypted matrix $C_1$ and the encrypted matrix $C_2$ can be calculated, corresponding to the encrypted processed data EPD. The processed data PD can then be calculated based on the matrices $A_1$ and $A_3$ as $$A_1^{-1} \cdot (C_1 + C_2) \cdot A_2 = A_1^{-1} \cdot A_1 \cdot D_1 \cdot A_2^{-1} \cdot A_2 + A_1^{-1} \cdot A_1 \cdot D_2 \cdot A_2^{-1} \cdot A_2 = D_1 + D_2$$

and is in fact equivalent to the sum $D_1 + D_2$ of the plaintext matrix $D_1$ and the plaintext matrix $D_2$.

Figure 4:
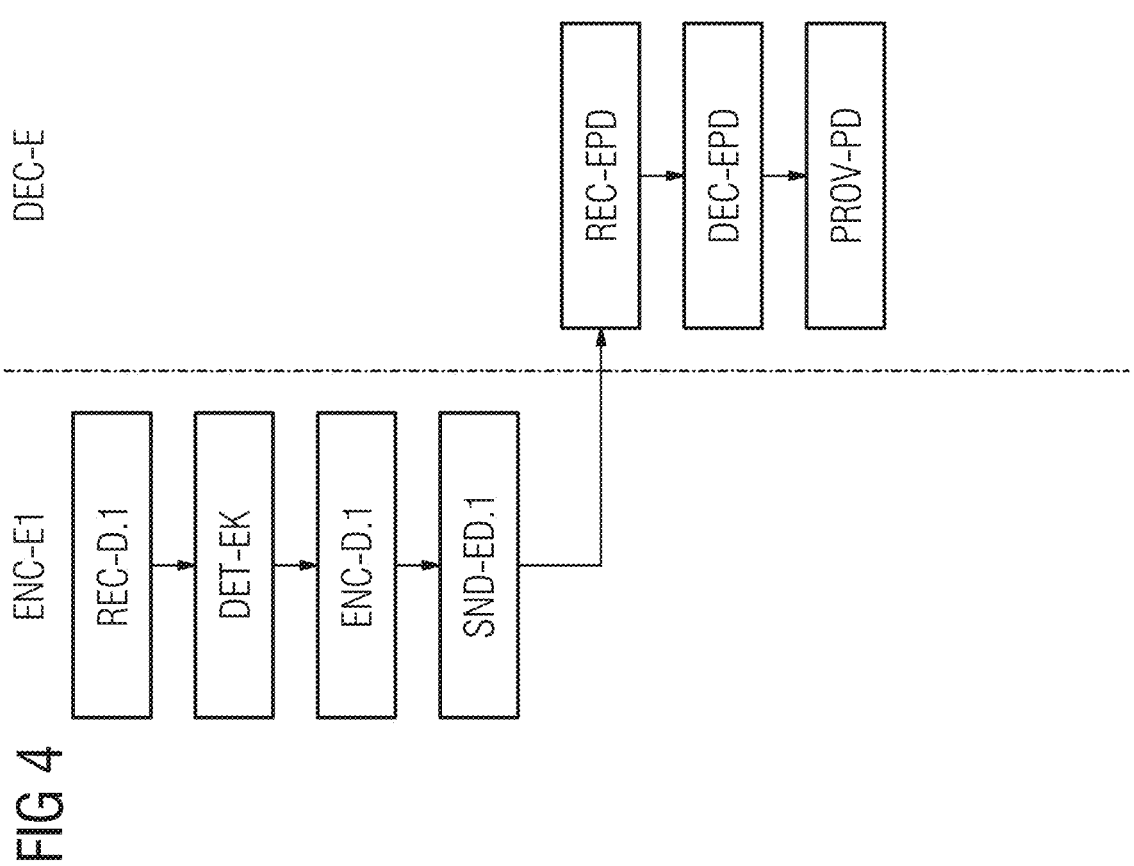

FIG. 4 displays a flowchart of a first embodiment of the method for providing processed data PD.

The first step of the first embodiment is receiving REC-D.1, by a first encryption entity ENC-E1, first plaintext data D.1, the first plaintext data D.1 comprising a matrix of numbers. In this embodiment, the first plaintext data D.1 is a two-dimensional or three-dimensional medical image which is encoded into an integer vector (e.g., the values of the matrix can correspond to Hounsfield units of a slice of a computed tomography imaging of a certain patient). For example, if the two-dimensional medical image has 128×128 pixels, it can be encoded into an integer vector with 128.128=16.384 entries. Alternatively, the first plaintext data D.1 could be other data, e.g. a vector or a matrix of patient measurements (e.g. lab results, weight of the patient, blood pressure of the patient), in particular, time-resolved data of such a patient.

The next step of the first embodiment is determining DET-EK, by the first encryption entity ENC-E, an encryption key EK, the encryption key EK comprising an integer matrix. Within this embodiment, the encryption key EK is equivalent to a random integer matrix, wherein each entry of the random integer matrix is separately by a random number generator generating integers between 0 and a certain maximal value. For example, if the plaintext data D.1 is an integer vector with 128.128=16.384 entries, the encryption key could be an 16.384×16.384 integer matrix.

The next step of the first embodiment is homomorphically encrypting ENC-D.1, by the first encryption entity ENC-E, the first plaintext data D.1 based on a matrix multiplication of the first plaintext data D.1 and the encryption key EK, thereby generating first encrypted data ED.1. In this embodiment, the first encrypted data ED.1 is the result of the multiplication of the integer matrix of the encryption key EK, and the matrix representing the medical image (alternatively, the vector or the matrix representing the patient data) comprised by the plaintext data D.1.

The next steps of the first embodiment are sending SND-ED.1, by the first encryption entity ENC-E1, the first encrypted data ED.1 to a processing entity PROC-E, and receiving REC-EPD, by a decryption entity DEC-E, encrypted processed data EPD from the processing entity PROC-E, wherein the encrypted processed data EPD is based on the first encrypted data ED.1. In this embodiment, the first encryption entity ENC-E1 and the processing entity PROC-E are different entities, which may be located at different geographical locations. Alternatively, the first encryption entity ENC-E1 and the processing entity PROC-E can be the same entities.

In this embodiment, the encrypted processed data EPD is the result of a matrix multiplication of a matrix representing a convolutional kernel, and the first encrypted data ED.1. It is well-known for a person skilled in the art that a convolution with a certain filter kernel can be expressed in terms of a matrix multiplication. Such convolutions with a kernel can be used, in particular, for blurring, sharpening, embossing or edge detection within images.

The next step of the first embodiment is decrypting DEC-EPD, by the decryption entity DEC-E, the encrypted processed data EPD based on a matrix multiplication of the processed data EPD and the inverse of the encryption key EK, thereby generating processed data PD. In this embodiment, the processed data is again a vector corresponding to the two-dimensional image, whose entries can be rearranged as a two-dimensional image being the result of the convolution of the first plaintext data D.1 with the convolutional kernel.

The last step of the displayed first embodiment is providing PROV-PD, by the decryption entity DEC-E, the processed data PD. In particular, providing PROV-PD the processed data PD can comprise storing, transmitting or displaying the processed data PD.

Figure 5:
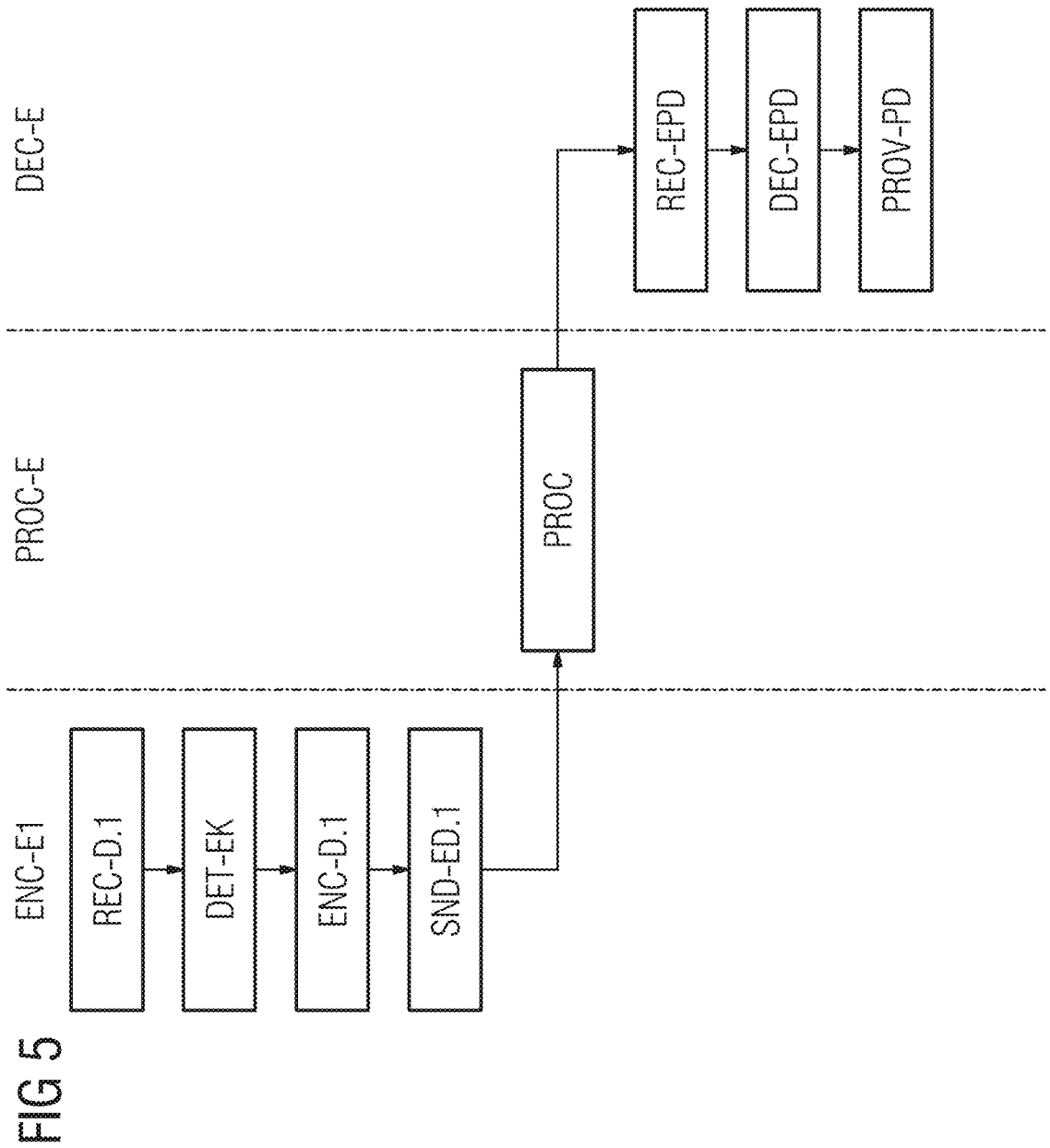

FIG. 5 displays a flowchart of a second embodiment of the method for providing processed data PD. The second embodiment comprises all steps of the first embodiment displayed in FIG. 4, and these steps can comprise all features and embodiments described with respect to FIG. 4.

Additionally, the second embodiment comprises the step of processing PROC, by the processing entity PROC-E, the first encrypted data ED.1, thereby generating the encrypted processed data EPD. Within this second embodiment, the first encrypted data ED.1 is processed by multiplying it with a matrix corresponding to a convolution operation based on a kernel.

Figure 6:
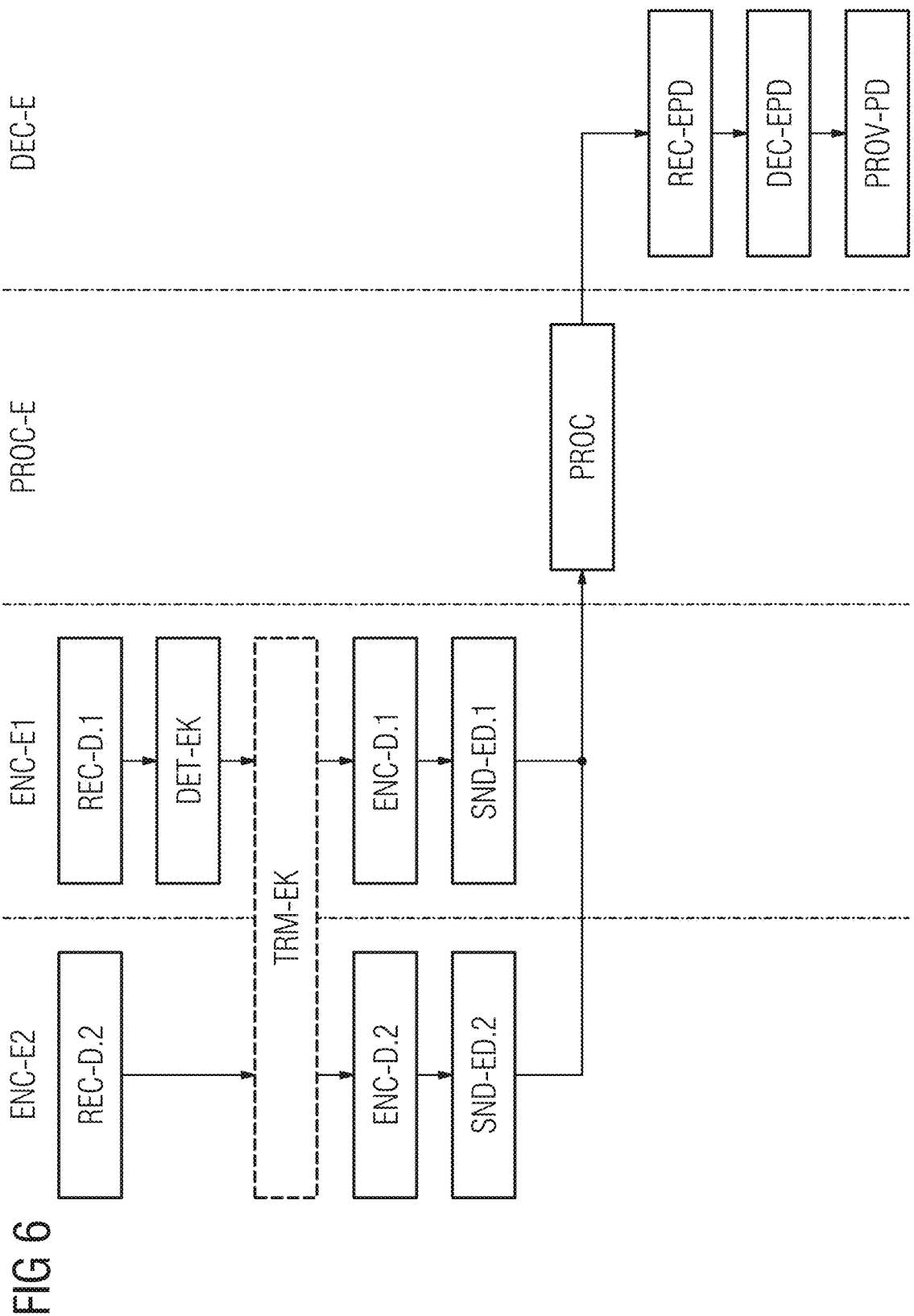

FIG. 6 displays a flowchart of a third embodiment of the method for providing processed data PD. The third embodiment comprises all steps of the second embodiment displayed in FIG. 5, and these steps can comprise all features and embodiments described with respect to FIG. 5.

Additionally, the third embodiment comprise receiving REC-D.2, by a second encryption entity ENC-E2, second plaintext data D.2, the second plaintext data D.2 comprising a matrix of numbers. In this third embodiment, the first encryption entity ENC-E1 and the second encryption entity ENC-E2 are separate entities. In particular, the second plaintext data D.2 can comprise all advantageous features and embodiments as the first plaintext data D.1.

In this third embodiment, the second plaintext data D.2 comprises a convolutional kernel to be used on the first plaintext data D.1. In particular, if the first plaintext data D.1 corresponds to a medical image comprising 128×128 pixels that can be encoded into an integer vector with 128.128=16.384 entries, the second plaintext data can be a matrix with 16.384×16.384 entries, each entry corresponding to the effect of convoluting with a kernel on a pair of pixels. In particular, the second plaintext data D.2 can be stored as a sparse matrix.

The third embodiment also comprises the optional step of transmitting TRM-EK the encryption key EK, in particular, from the first encryption entity ENC-E1 to the second encryption entity ENC-E2. The step of transmitting TRM-EK the encryption key EK can either directly transmit the encryption key EK, or alternatively data that allows to reconstruct the encryption key EK.

Furthermore, the third embodiment comprises homomorphically encrypting ENC-D.2, by the second encryption entity ENC-E2, the second plaintext data D.2 based on a matrix multiplication of the second plaintext data D.2 and the encryption key EK, thereby generating second encrypted data ED.2. In particular, in this third embodiment the second encrypted data ED.2 is based on a matrix multiplication of the second plaintext data D.2, the encryption key EK and the inverse of the encryption key EK, as described above.

Furthermore, the third embodiment comprises sending SND-ED.2, by the second encryption entity ENC-E2, the second encrypted data ED.2 to the processing entity PROC-E. Within the third embodiment, the encrypted processed data EPD is furthermore based on the second encrypted data ED.2. In particular, the encrypted processed data is the matrix multiplication of the second encrypted data ED.2 and the first encrypted data ED.2.

Figure 7:
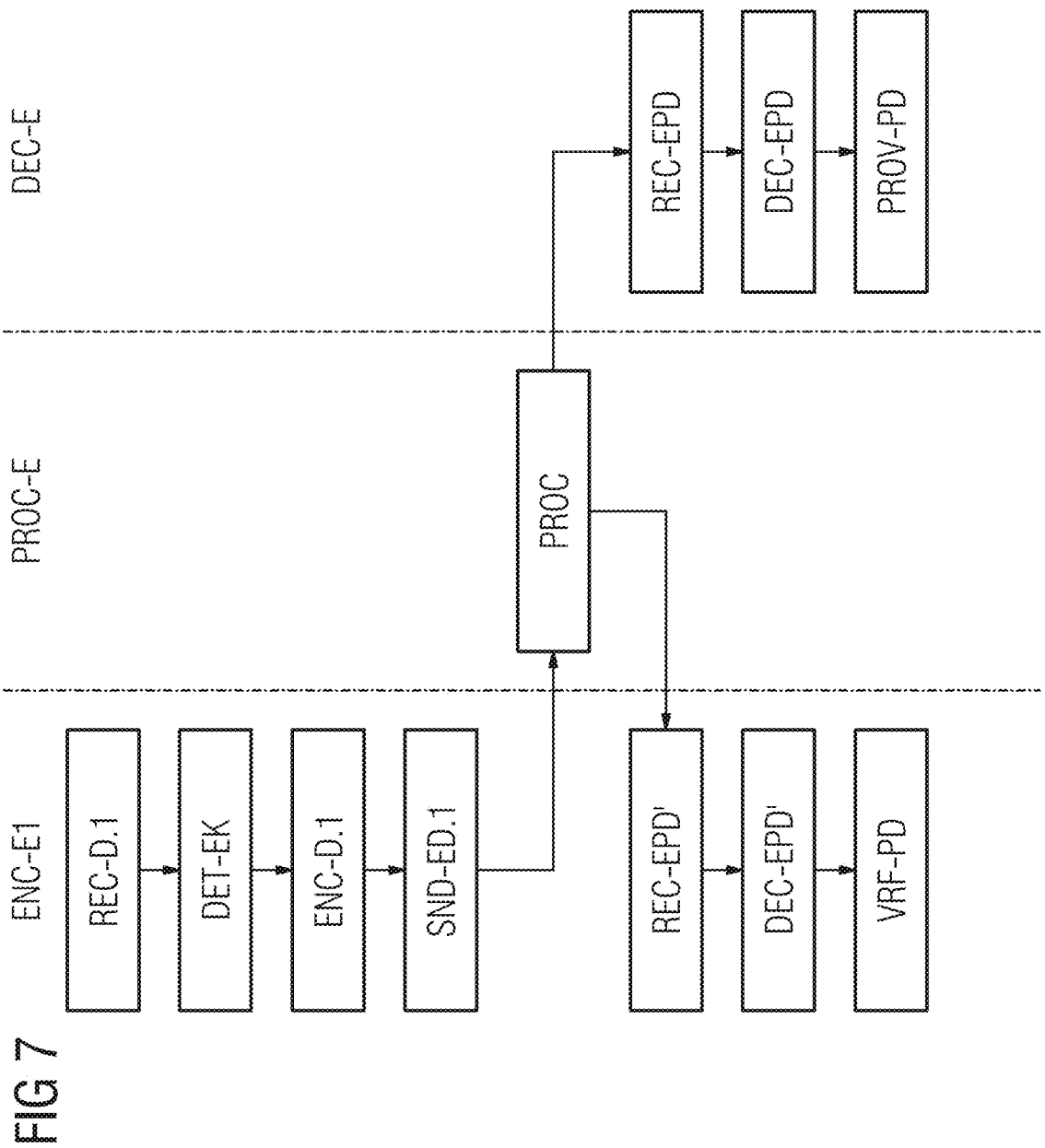

FIG. 7 displays a flowchart of a fourth embodiment of the method for providing processed data PD. The fourth embodiment comprises all steps of the second embodiment displayed in FIG. 5, and these steps can comprise all features and embodiments described with respect to FIG. 5.

The displayed fourth embodiment of the method furthermore comprises the step of receiving REC-EPD', by the first encryption entity ENC-E1, the encrypted processed data EPD from the processing entity PROC-E. In this embodiment, the processing entity PROC-E automatically sends the encrypted processed data EPD to the first encryption entity ENC-E1 after the step of processing PROC by the processing entity PROC-E the first encrypted data ED.1 and/or the second encrypted data ED.2, and the step of receiving REC-EPD the encrypted processed data EPD is automatically executed as a response. Alternatively, the step of receiving REC-EPD' can comprise a request from the first encryption entity ENC-E1 to the processing entity PROC-E to provide the encrypted processed data EPD, and the processing entity PROC-E sends the encrypted processed data EPD as a response to this request.

The fourth embodiment furthermore comprises the step of decrypting DEC-EPD', by the first encryption entity ENC-E1, the encrypted processed data EPD, thereby generating the processed data PD. In this embodiment, decrypting DEC-EPD' the encrypted processed data EPD is based on the encryption key EK and is the inverse operation of encrypting using the encryption key. In particular, the step of decrypting DEC-EPD', by the first encryption entity ENC-E1, the encrypted processed data EPD, is equivalent with the step of decrypting DEC-EPD, by the decryption entity DEC-ED, the encrypted processed data EPD, A further additional step of the fourth embodiment is verifying VRF-PD, by the first encryption entity ENC-E1, the processed data PD. In this embodiment, verifying VRF-PD the processed data PD comprises calculating only parts of the processed data PD directly based on the first plaintext data D.1 and/or the second plaintext data D.2, and comparing these parts with the respective parts of the processed data PD generated by decrypting DEC-EPD' the encrypted processed data EPD. For example, in this embodiment, the convolution operation is only executed for certain pixels or voxels, and only those pixels are compared with the result of decrypting DEC-EPD' the encrypted processed data EPD. By calculating only those parts, calculation time at the first encryption entity ENC-E1 can be reduced.

Figure 8:
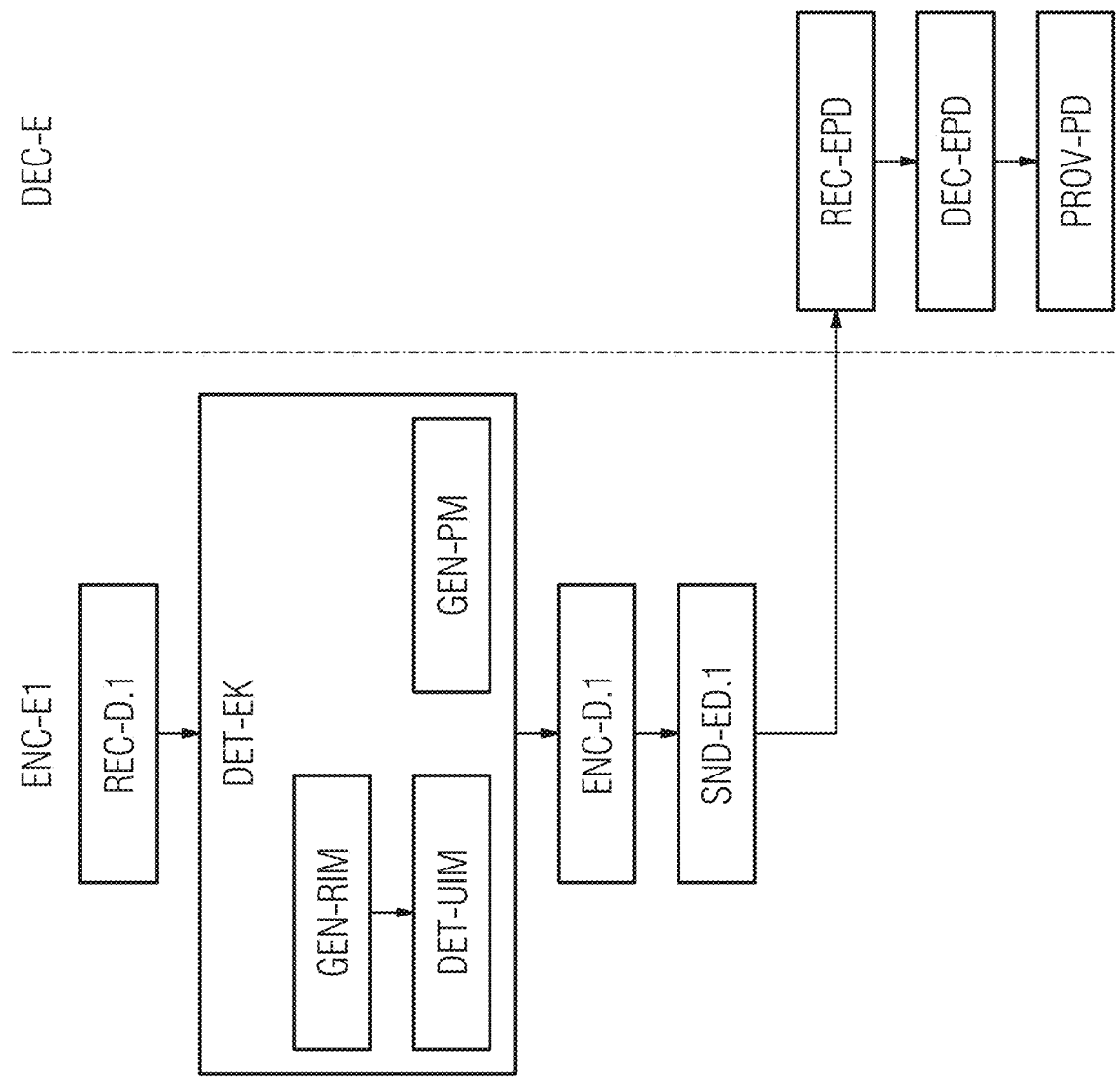

FIG. 8 displays a flowchart of a fifth embodiment of the method for providing processed data PD. The fifth embodiment comprises all steps of the first embodiment displayed in FIG. 4, and these steps can comprise all features and embodiments described with respect to FIG. 4.

Within this fifth embodiment, the step of determining DET-EK, by the first encryption entity ENC-E, an encryption key EK comprises the substeps of generating GEN-RIM a random integer matrix RIM and determining DET-UIM a unimodular integer matrix UIM. Herein, the matrix product of the unimodular integer matrix UIM and the random integer matrix RIM equals the hermite normal form of the random integer matrix RIM, and the encryption key EK comprises the matrix product of the unimodular integer matrix UIM, of an exchange matrix and of the inverse of the unimodular integer matrix UIM.

In particular, the fifth embodiment corresponds to the data flow diagram displayed in FIG. 3.

Figure 9:
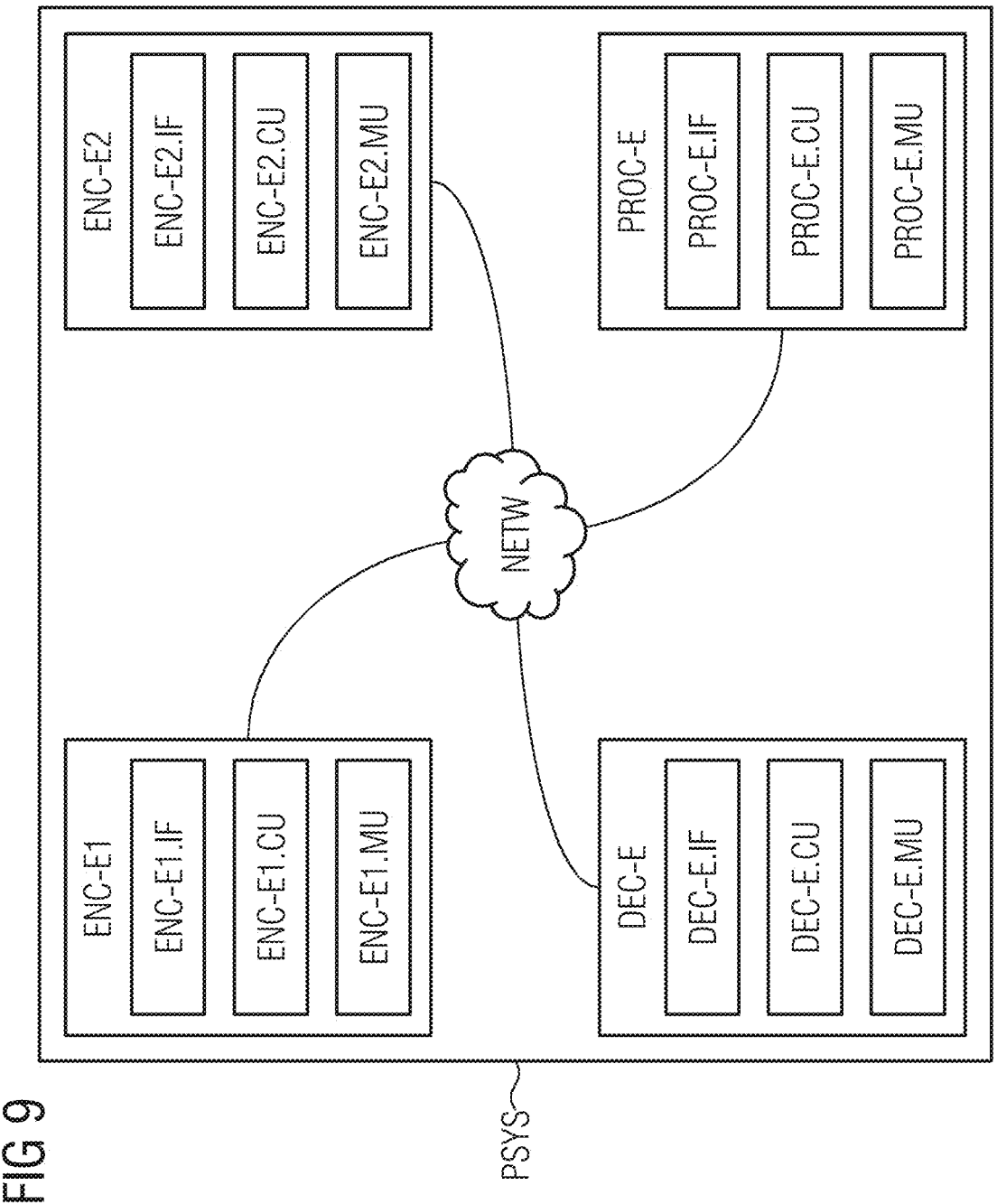

FIG. 9 displays embodiments of a first encryption entity ENC-E1, a second encryption entity ENC-E2, a decryption entity DEC-E and a cloud entity PROC-E. The first encryption entity ENC-E1 comprises an interface ENC-E1.IF, a computation unit ENC-E1.CU and a memory unit ENC-E1.MU. The second encryption entity ENC-E2 comprises an interface ENC-E1.IF, a computation unit ENC-E2.CU and a memory unit ENC-E2.MU. The decryption entity DEC-E comprises an interface DEC-E.IF, a computation unit DEC-E.CU and a memory unit DEC-E.MU. The cloud entity PROC-E comprises an interface CLD-E.IF, a computation unit CLD-E.CU and a memory unit CLD-E.MU.

The first encryption entity ENC-E1, the second encryption entity ENC-E2, the decryption entity DEC-E and/or the cloud entity PROC-E can be a (personal) computer, a workstation, a virtual machine running on host hardware, a microcontroller, or an integrated circuit. In particular, first encryption entity ENC-E1, the second encryption entity ENC-E2 and/or the decryption entity DEC-E can be mobile devices, e.g. a smartphone or a tablet. As an alternative, first encryption entity ENC-E1, the second encryption entity ENC-E2, the decryption entity DEC-E and/or the cloud entity PROC-E can be a real or a virtual group of computers (the technical term for a real group of computers is "cluster", the technical term for a virtual group of computers is "cloud").

The interfaces ENC-E1.IF, ENC-E2.IF, DEC-E.IF, PROCE.IF can be embodied as a hard-ware interface or as a software interface (e.g. PCIBus, USB or Firewire). In general, the computation units ENC-E1.CU, ENC-E2.CU, DEC-E.CU, PROCE.CU can comprise hardware elements and software elements, for example a microprocessor, a CPU (acronym for "central processing unit"), a GPU (acronym for "graphical processing unit"), a field programmable gate array (an acronym is "FPGA") or an ASIC. (acronym for "application-specific integrated circuit"). The computation units ENC-E1.CU, ENC-E2.CU, DEC-E.CU, PROC-E.CU can be configured for multithreading, i.e. the computation units ENC-E1.CU, ENC-E2.CU, DEC-E.CU, PROC-E.CU can host different calculation processes at the same time, executing the either in parallel or switching between active and passive calculation processes. The memory units ENC-E1.MU, ENC-E2.MU, DEC-E.MU, PROC-E.MU can be e.g. non-permanent main memory (e.g. random access memory) or permanent mass storage (e.g. hard disk, USB stick, SD card, solid state disk).

Any one of the interfaces ENC-E1.IF, ENC-E2.IF, DEC-E.IF, PROC-E.IF can comprise several (potentially spatially) separate sub-interfaces, each having the characteristics of an interface described above. Any one of the computation units ENC-E1.CU, ENC-E2.CU, DEC-E.CU, PROC-E.CU can comprise several (potentially spatially) separate computation sub-units, each having the characteristics of a computation unit described above. Any one of the memory units ENC-E1.MU, ENC-E2.MU, DEC-E.MU, PROC-E.MU can comprise several (potentially spatially) separate memory sub-units, each having the characteristics of a memory unit described above.

The first encryption entity ENC-E1, the second encryption entity ENC-E2, the decryption entity DEC-E and/or the cloud entity PROC-E are connected by way of a network NETW. The network NETW can be a local area network (acronym "LAN") like an intranet, a wide area network (acronym "WAN") like the internet, or a combination thereof. The network NETW can comprise wireless communication components, like WiFi or Bluetooth.

Wherever not already described explicitly, individual embodiments, or their individual aspects and features, can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

The following clauses form also part of the disclosure:

Clause 1: A computer-implemented method for sending first encrypted data ED.1 to a processing entity PROC-E, comprising:
- receiving REC-D.1 first plaintext data D.1, the first plaintext data D.1 comprising a matrix of numbers,
- determining DET-EK an encryption key EK, the encryption key EK comprising an integer matrix,
- homomorphically encrypting ENC-D.1, the first plaintext data D.1 based on a matrix multiplication of the first plaintext data D.1 and the encryption key EK, thereby generating the first encrypted data ED.1,
- sending SND-ED.1 the first encrypted data ED.1 to the processing entity PROC-E.

Clause 2: The method according to clause 1, furthermore comprising:
- processing PROC, by the processing entity PROC-E, the first encrypted data ED.1, thereby generating the encrypted processed data EPD.

Clause 3: The method according to clause 2, wherein the first encrypted data ED.1 comprises at least one matrix of numbers, wherein processing PROC the first encrypted data ED.1 comprises at least one of the following operations:
- inversion of the first encrypted data ED.1,
- scalar multiplication of a number and the first encrypted data ED.1, addition or subtraction of the first encrypted data ED.1 and another matrix of numbers, matrix multiplication of the first encrypted data ED.1 another matrix of numbers.

Clause 4: The method according to clause 3, wherein processing PROC the first encrypted data ED.1 comprises training a machine learning model.

Clause 5: The method according to one of the preceding clauses, wherein the step of determining DET-EK the encryption key EK comprises:

generating GEN-RIM a random integer matrix RIM, determining DET-UIM a unimodular integer matrix UIM, wherein the matrix product of the unimodular integer matrix UIM and the random integer matrix RIM equals the hermite normal form of the random integer matrix RIM, wherein the encryption key EK comprises the matrix product of the unimodular integer matrix UIM, of an exchange matrix and of the inverse of the unimodular integer matrix UIM.

Clause 6: The method according to one of the preceding clauses, wherein the first plaintext data D.1 comprises an integer matrix.

Clause 7: The method according to one of the clauses 1 to 5, wherein the first plaintext data D.1 and the encryption key EK are matrices over a finite field.

Clause 8: A first encryption entity ENC-E1, comprising at least one device for receiving REC-D.1 first plaintext data D.1, the first plaintext data D.1 comprising a matrix of numbers, at least one device for determining DET-EK an encryption key EK, the encryption key EK comprising an integer matrix, at least one device for homomorphically encrypting ENC-D.1 the first plaintext data D.1 based on a matrix multiplication of the first plaintext data D.1 and the encryption key EK, thereby generating first encrypted data ED.1, at least one device for sending SND-ED.1 the first encrypted data ED.1 to a processing entity PROC-E.

Clause 9: A computer program comprising instructions which, when the program is executed by a first encryption entity ENC-E1, cause the first encryption entity ENC-E1 to carry out the method of one of the clauses 1 to 7.

Clause 10: A computer-readable medium comprising instructions which, when executed by a first encryption entity ENC-E1, cause the first encryption entity ENC-E1 to carry out the method of one of the clauses 1 to 7.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for providing processed data, comprising:

receiving, by a first encryption entity, first plaintext data, the first plaintext data including a matrix of numbers;

determining, by the first encryption entity, an encryption key, the encryption key including an integer matrix;

homomorphically encrypting, by the first encryption entity, the first plaintext data based on a matrix multiplication of the first plaintext data and the encryption key, to generate first encrypted data;

sending, by the first encryption entity, the first encrypted data to a processing entity;

receiving, by a decryption entity, encrypted processed data from the processing entity, the encrypted processed data being based on the first encrypted data;

decrypting, by the decryption entity, the encrypted processed data based on a matrix multiplication of the processed data and an inverse of the encryption key, to generate processed data; and providing, by the decryption entity, the processed data, wherein the determining of the encryption key comprises:

generating a random integer matrix; and determining a unimodular integer matrix, wherein a matrix product of the unimodular integer matrix and the random integer matrix equals a hermite normal form of the random integer matrix, and wherein the encryption key includes the matrix product of the unimodular integer matrix, of an exchange matrix and of an inverse of the unimodular integer matrix.

2. The method of claim 1, further comprising:

receiving, by a second encryption entity, second plaintext data, the second plaintext data including a matrix of numbers;

homomorphically encrypting, by the second encryption entity, the second plaintext data based on a matrix multiplication of the second plaintext data and the encryption key, to generate second encrypted data; and sending, by the second encryption entity, the second encrypted data to the processing entity, wherein the encrypted processed data is further based on the second encrypted data.

3. The method of claim 2, further comprising:

processing, by the processing entity, at least one of the first encrypted data and the second encrypted data, to generate the encrypted processed data.

4. The method of claim 3, wherein at least one of the first encrypted data and the second encrypted data includes at least one matrix of numbers and wherein processing of at least one of the first encrypted data and the second encrypted data includes at least one of:

inversion of at least one of the first encrypted data and the second encrypted data, scalar multiplication of a number and at least one of the first encrypted data and the second encrypted data, addition or subtraction of the first encrypted data and the second encrypted data, and matrix multiplication of the first encrypted data and the second encrypted data.

5. The method of claim 4, wherein processing of at least one of the first encrypted data and the second encrypted data includes training a machine learning model.

6. The method of claim 3, wherein processing of at least one of the first encrypted data and the second encrypted data includes training a machine learning model.

7. A non-transitory computer-readable medium storing instructions which, when executed by a providing system, cause the providing system to carry out the method of claim 3.

8. The method of claim 2, wherein at least one of the first plaintext data and the second plaintext data are integer matrices.

9. A non-transitory computer program product storing a program including instructions which, when the program is executed by a providing system, cause the providing system to carry out the method of claim 2.

10. A non-transitory computer-readable medium storing instructions which, when executed by a providing system, cause the providing system to carry out the method of claim 2.

11. The method of claim 1, wherein the first plaintext data and the encryption key are matrices over a finite field.

12. The method of claim 1, wherein the processed data includes parameters of a machine learning model.

13. The method of claim 12, wherein the machine learning model is an artificial neural network, and wherein the processed data includes edge weights of the artificial neural network.

14. The method of claim 1, further comprising:
receiving, by the first encryption entity, the encrypted processed data from the processing entity;
decrypting, by the first encryption entity, the encrypted processed data, to generate the processed data; and
verifying, by the first encryption entity, the processed data.

15. A providing system for providing processed data, comprising:
a first encryption entity, configured to
receive first plaintext data, the first plaintext data including a matrix of numbers,
determine an encryption key, the encryption key including an integer matrix,
homomorphically encrypt the first plaintext data based on a matrix multiplication of the first plaintext data and the encryption key, to generate first encrypted data, and
send the first encrypted data to a processing entity; and
a decryption entity, configured to
receive encrypted processed data from the processing entity, the encrypted processed data being based on the first encrypted data,
decrypt the encrypted processed data based on a matrix multiplication of the processed data and an inverse of the encryption key, to generate processed data, and
provide the processed data
wherein determining of the encryption key by the first encryption entity comprises:
generating a random integer matrix, and
determining a unimodular integer matrix,
wherein a matrix product of the unimodular integer matrix and the random integer matrix equals a hermite normal form of the random integer matrix, and
wherein the encryption key includes the matrix product of the unimodular integer matrix, of an exchange matrix and of an inverse of the unimodular integer matrix.

16. The providing system of claim 15, further comprising:
a processing entity configured to process the first encrypted data, to generate the encrypted processed data.

17. A non-transitory computer program product storing a program including instructions which, when the program is executed by a providing system, cause the providing system to carry out the method of claim 1.

18. A non-transitory computer-readable medium storing instructions which, when executed by a providing system, cause the providing system to carry out the method of claim 1.

* * * * *